United States Patent
Morales et al.

(10) Patent No.: US 8,456,690 B2
(45) Date of Patent: Jun. 4, 2013

(54) IMPOSITION ENHANCEMENTS FOR AUTOMATIC DOCUMENT PRINTING

(75) Inventors: Javier A. Morales, Irondequoit, NY (US); Roman Liccini, Los Angeles, CA (US); Nishan Hossepian, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1600 days.

(21) Appl. No.: 11/643,439

(22) Filed: Dec. 21, 2006

(65) Prior Publication Data

US 2008/0151322 A1 Jun. 26, 2008

(51) Int. Cl.
*G06K 15/00* (2006.01)
*H04N 1/387* (2006.01)

(52) U.S. Cl.
USPC .......... 358/1.18; 358/448; 358/450; 715/243; 382/284; 382/293; 382/294

(58) Field of Classification Search
USPC 358/400, 443, 448–453, 1.18, 1.13; 715/243; 382/284, 293, 294, 305
See application file for complete search history.

(56) References Cited

U.S. PATENT DOCUMENTS

| | | | |
|---|---|---|---|
| 6,175,423 B1 * | 1/2001 | Frickey | 358/1.2 |
| 6,288,719 B1 * | 9/2001 | Squilla et al. | 715/805 |
| 6,738,154 B1 * | 5/2004 | Venable | 358/1.15 |
| 7,454,697 B2 * | 11/2008 | Kremer et al. | 715/251 |
| 2002/0051208 A1 * | 5/2002 | Venable | 358/1.18 |
| 2002/0067508 A1 * | 6/2002 | Nishikawa et al. | 358/1.18 |
| 2003/0167447 A1 * | 9/2003 | Hatta et al. | 715/517 |
| 2004/0032599 A1 * | 2/2004 | Atkins et al. | 358/1.9 |
| 2004/0109201 A1 * | 6/2004 | Teraue | 358/1.18 |
| 2004/0181754 A1 * | 9/2004 | Kremer et al. | 715/526 |
| 2012/0170867 A1 * | 7/2012 | Chen et al. | 382/284 |

* cited by examiner

*Primary Examiner* — Dennis Dicker
(74) *Attorney, Agent, or Firm* — Fay Sharpe LLP (57) ABSTRACT

A method of automatically placing N-up images for imposition on media sheet for printing in which, for a user selected value of N, the co-ordinates of the sheet cells are determined and stored; and, the co-ordinates of the media, trim and bleed boxes of each of the images is determined and stored. The user selects, from a menu, a desired set of alignment rules and the system then compares the location of the appropriate bleed, trim or media box with the sheet cell boundaries and shifts the images and automatically locates the selected box on the sheet cell for the desired placement. The method is particularly useful for eliminating the template making in large print jobs for roll fed presses.

21 Claims, 9 Drawing Sheets

IMPOSITION ENHANCEMENTS FOR AUTOMATIC DOCUMENT PRINTING

BACKGROUND

The present disclosure relates to automatic printing and particularly to automatic printing of more than one image on a single sheet of print media, for example, where pages are to be imposed and printed on a single sheet for subsequent cutting of the pages or folding to create a multiple page folded document.

Where input document pages are placed on an imposed sheet, heretofore this permitted a single imposition template to be used for a range of input document sizes; however, the process did not permit imposition of documents that contain a bleed border.

Thus, it has been desired to provide the way or means for defining discrete areas such as trim and bleed on imposed documents in order that automatic placement of the images on the imposed document may be accomplished in various combinations and arrangements without the need for individual templates. Examples of such arrangements are gutterless centering of the images on the document or arranging the images with gutters along only preselected sides.

In digital printing in roll fed or sheet printers, it has been desired to reduce the time required for pre-press operations.

BRIEF DESCRIPTION

The present disclosure describes a method and apparatus for placement of plural (N-up) images on an imposed document automatically in a desired placement arrangement without the need for individual templates. In the exemplary embodiments disclosed the methods identify the coordinates of the various nested boxes on the image to be placed on the imposed document and compares the coordinates with the identified page cells of the imposed document and shifts the individual images according to user selected rules to arrange the imposed document for printing.

In one exemplary embodiment described in the present disclosure, adjacent images are placed on the imposed document with a predefined gutter between adjacent images and an aggregate boundary of the images automatically receives a gutter of half the inner image gutter at the edge of the sheet. In other exemplary disclosed embodiments, the images are clustered with images centered or cornered or edge aligned in the sheet cells. In further embodiments, selected areas of the images are rotated. The present disclosure describes apparatus and method which enable many different combinations and arrangements of the images on the imposed document without the need for individual templates for each type of image arrangement or placement. The disclosed method enables the ability to define a single set of image placement parameters that can be used in a variety of different print jobs with dissimilar dimensions without further operator intervention; and, the method has particular applicability to short run jobs in digital presses.

DETAILED DESCRIPTION

Figure 1:
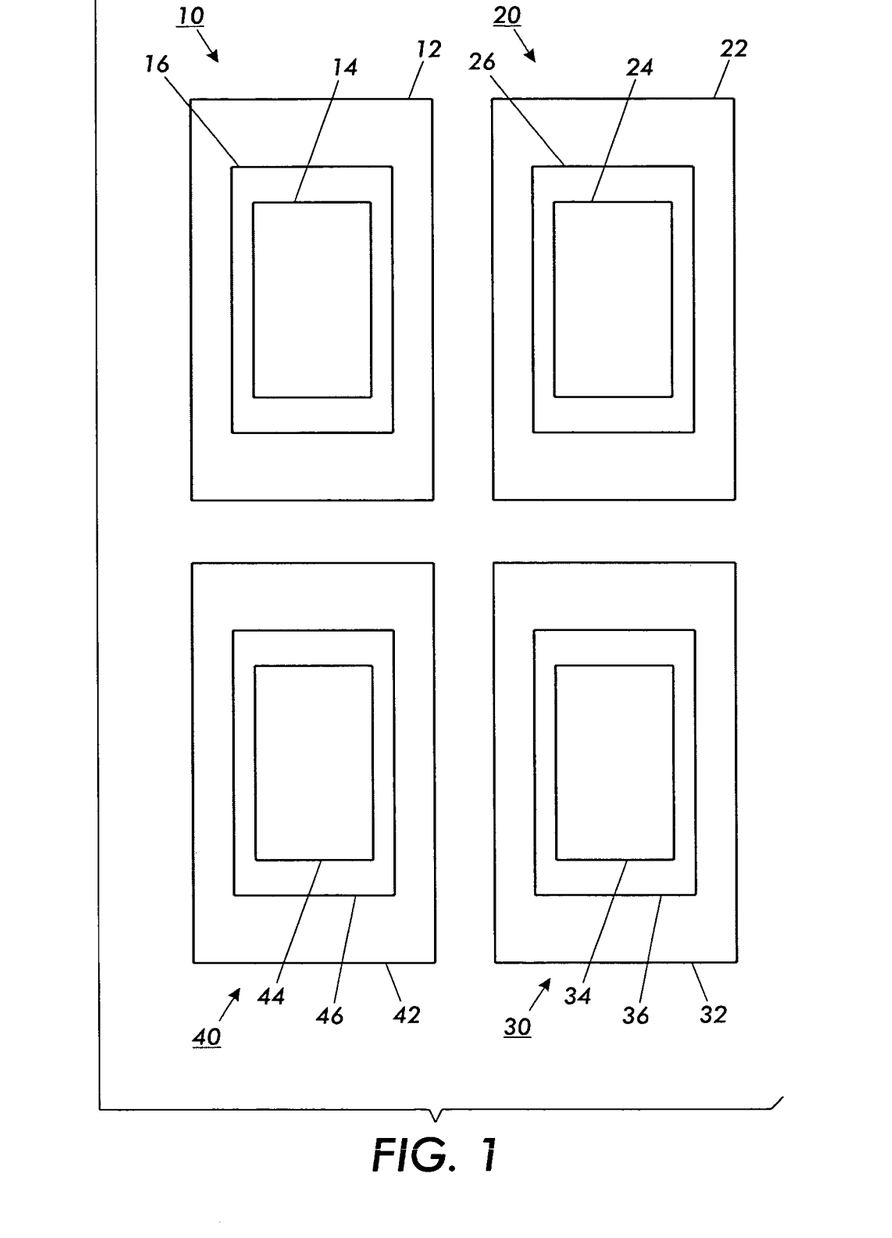
FIG. 1 is a pictorial representation of 4-up images to be imposed showing the bleed, trim and media boundaries of each image.

Referring to FIG. 1, a plurality of images where N-up equal 4-up indicated generally at 10, 20, 30, 40 are placed for imposition with the darker outer boundary 12, 22, 32, 42 respectively, comprising the media box for the particular image. The innermost border denoted respectively 14, 24, 34, 44 denotes the trim box for each image. The intermediate shaded border denoted respectively 16, 26, 36, 46 denotes the trim border or box respectively for each image.

Figure 2:
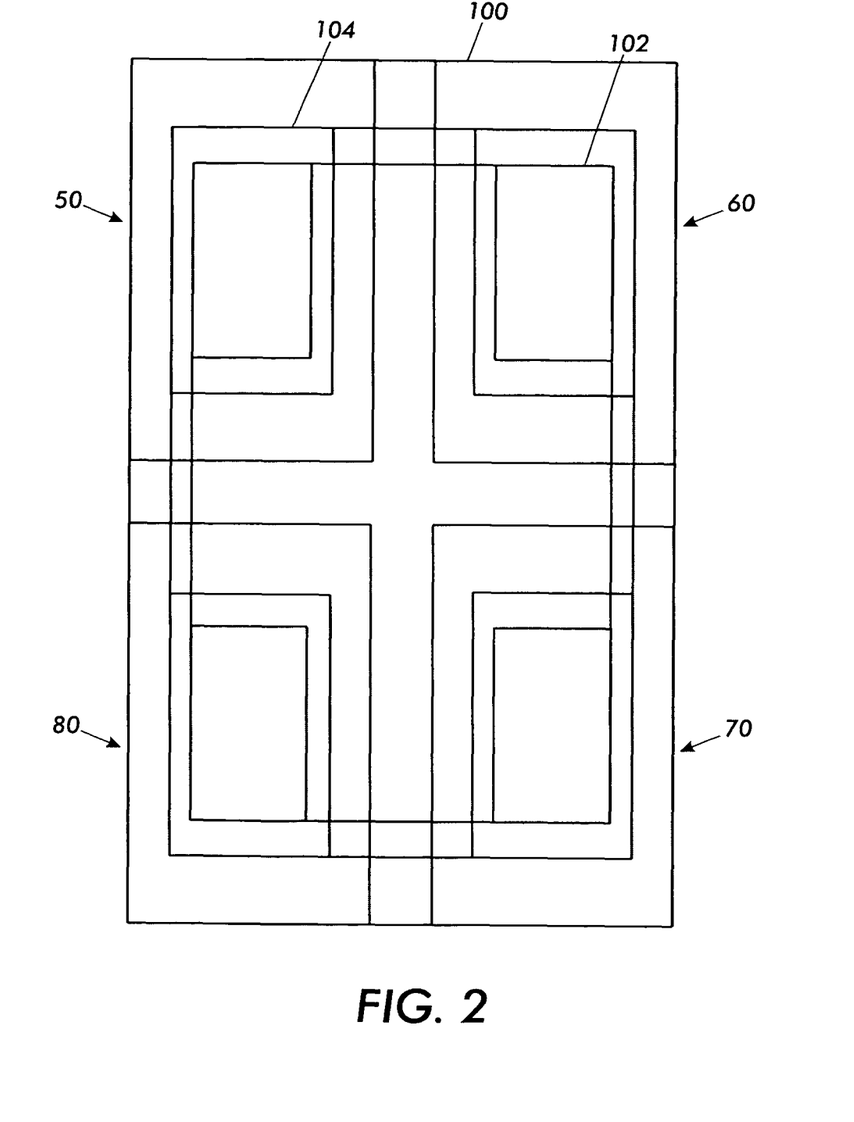
FIG. 2 is a view similar to FIG. 1 showing the aggregates of the trim bleed and media boundaries defined.

FIG. 2 shows a defined aggregate media border of the 4-up images denoted generally at 50, 60, 70, 80 in darkened outline and denoted by reference numeral 100 with the innermost aggregate boundary denoted at 102 defining an aggregate trim box boundary; and, the intermediate aggregate boundary of the images is denoted by reference numeral 104 and defines an aggregate bleed box boundary.

Figure 3:
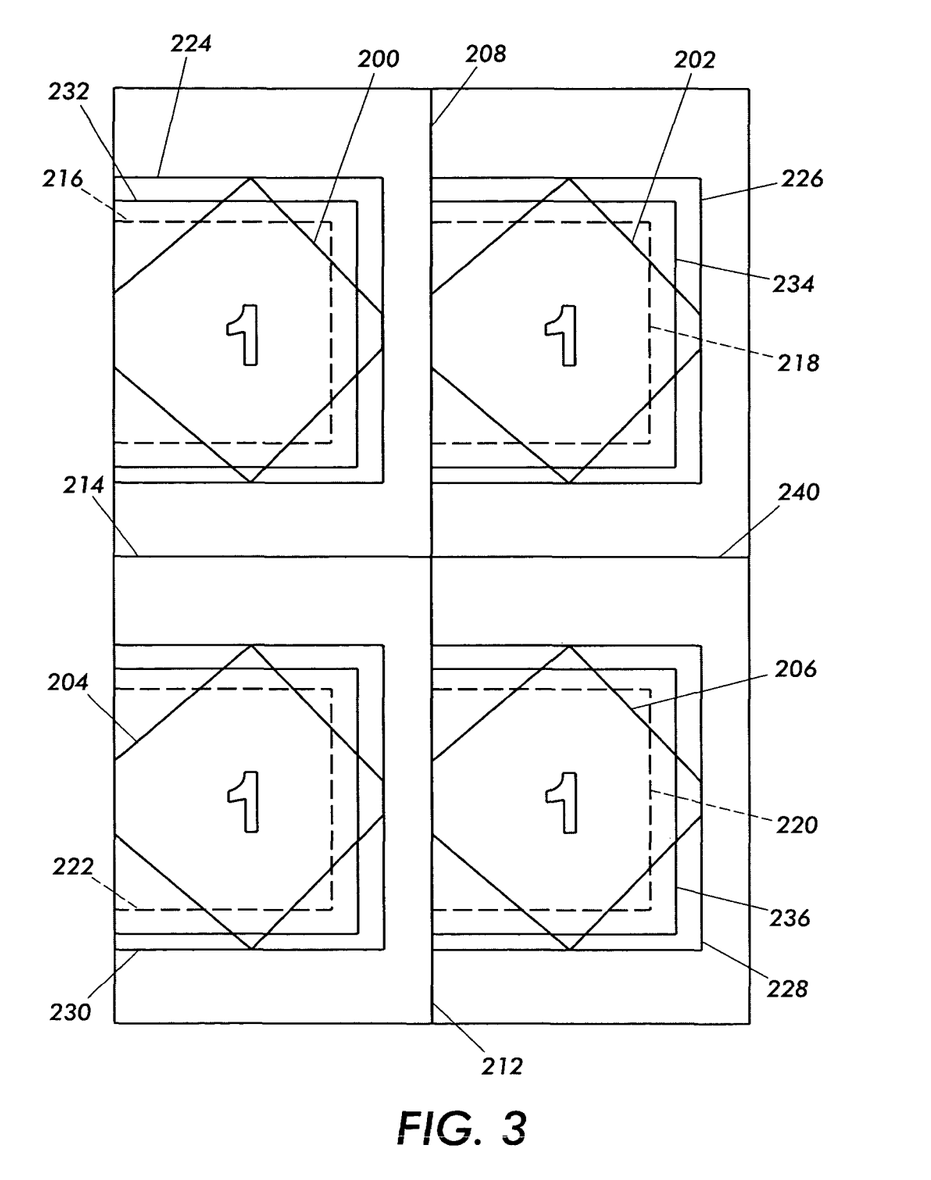
FIG. 3 shows a plurality of images placed on imposed document with the trim box of each image located on the left media edge and centered vertically in the respective sheet cell.

Referring to FIG. 3, an exemplary embodiment 4-up image is shown with the images placed for imposition with the image trim boundaries denoted respectively by reference numerals 216, 218, 220, 222. In the embodiment of FIG. 3, it is noted that the page cells are placed according to a user selected assignment rule which centers the trim boxes vertically in their respective sheet cells and abuts them on the left edge of their respective sheet cells.

In the present practice of the disclosure, the images may be in any of various document languages as, for example PDL, PDF, or TIFF. The sheet cell boundaries are denoted by the lines 208, 240, 212, 214.

The dashed outline defines the trim box for each of the images as denoted respectively by reference numerals 216, 218, 220, 222; and, the solid outline edges of the image is the media box for the images as denoted by reference numerals 224, 226, 228, 230. The solid outline intermediate the trim box and the media box defines the bleed box for each of the images as denoted respectively by reference numerals 232, 234, 236, 238. The dashed line trim boxes 216, 128, 220, 222 are also known as page cells.

Figure 4:
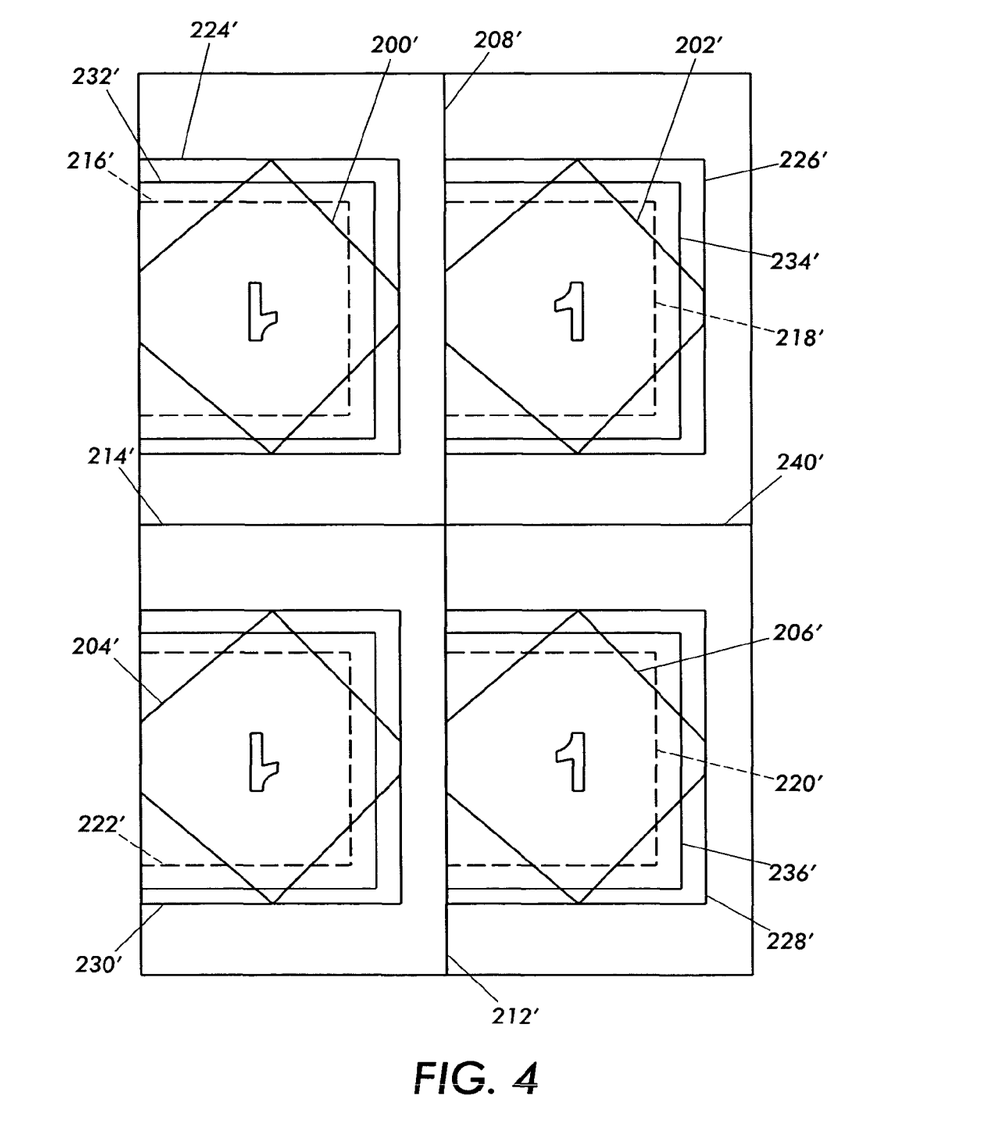
FIG. 4 is a view similar to FIG. 3 with a pair of the images inverted.

Referring to FIG. 4, another exemplary embodiment is illustrated in which 4-up images are identically shown placed as shown in FIG. 3 for imposition except the left hand image of each pair is inverted. The trim boxes or page cells, the media boxes, the bleed boxes and the sheet cells bear primed numbers corresponding to the reference numerals in FIG. 3 for similar features. In the embodiment of FIG. 4, the media boxes denoted respectively 224', 226', 228', 230' thus encompass an area outside of the trim boxes 216', 218', 220', 222' which effectively is the bleed area for each of the images.

Figure 5:
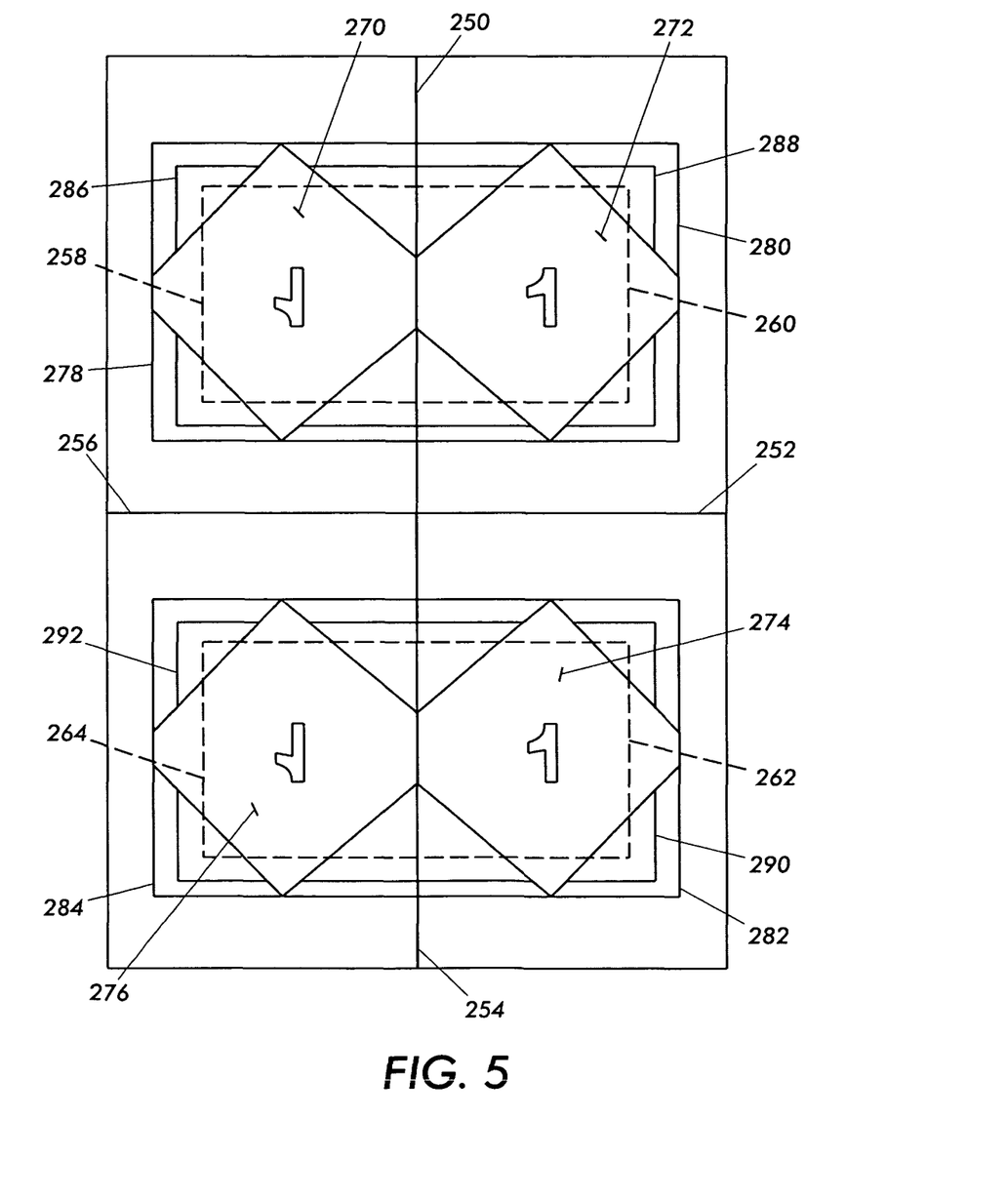
FIG. 5 is a view similar to FIG. 4 showing an embodiment with the trim boxes centered vertically in the sheet cell and clustered at the spine.

Referring to FIG. 5, another exemplary embodiment is illustrated for 4-up imposition of images 270, 272, 274, 276 in which the sheet cells are formed by boundary lines 250, 252, 254, 256 with the page cells or trim boxes denoted by reference numerals 258, 260, 262, 264. In the embodiment of FIG. 5, the page cells or trim boxes 258 are located with a side aligned with the spine or sheet cell boundary 250 and page cells or trim boxes 262, 264 have a side coincident with the sheet cell boundary 254 and the page cells are centered vertically within the sheet cell. Images 270 and 276 are rotated about 180° or inverted with respect to images 272, 274; and, the media boxes are denoted by reference numerals 278, 280, 282, 284 with the intermediate bleed boxes denoted 286, 288, 290, 292. Although images 270, 276 are shown rotated about 180°, other intermediate angles of rotation may be used.

Figure 6:
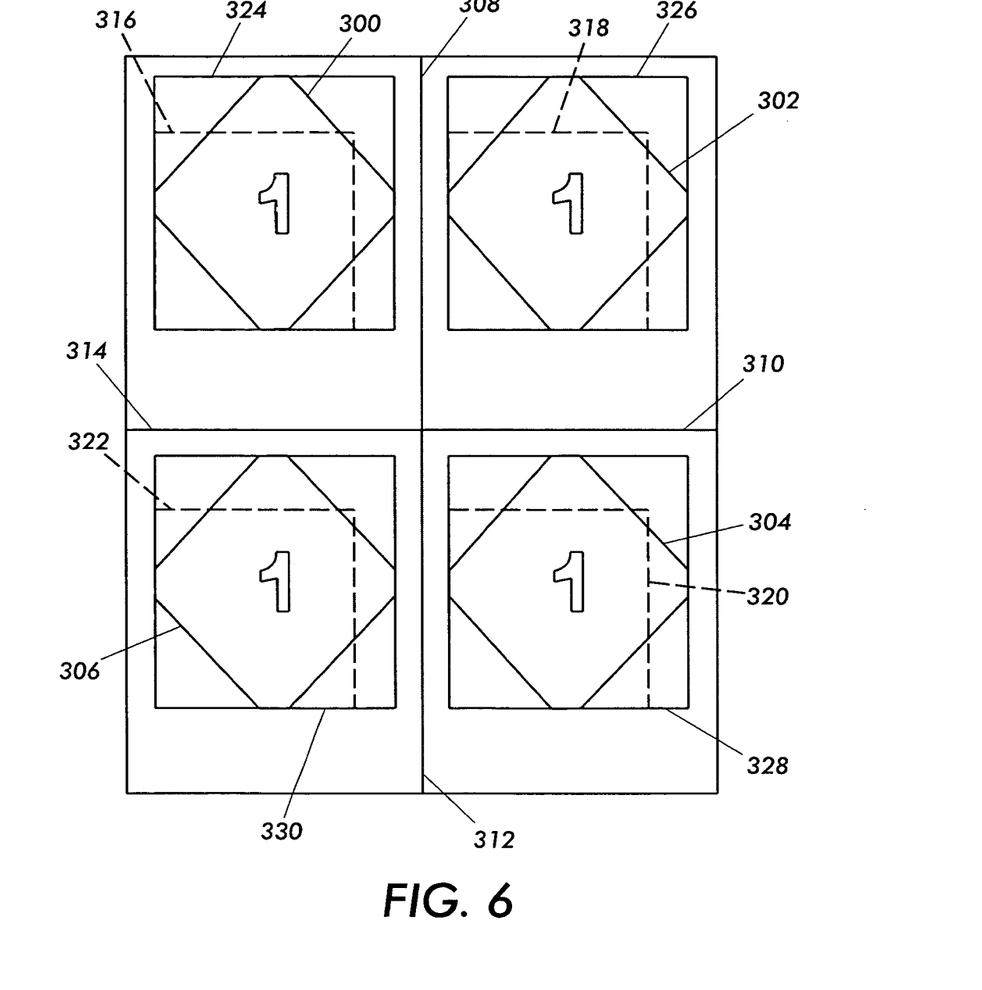
FIG. 6 is a view showing the adjacent images placed with the trim boxes vertically and horizontally centered in the respective sheet cell.

Referring to FIG. 6, another exemplary embodiment is illustrated for 4-up imposition in which the images 300, 302, 304, 306 are placed on sheet cells with central boundaries 308, 310, 312, 314. The images in the FIG. 6 embodiment are placed with the trim boxes 316, 318, 320, 322 centered vertically and horizontally in their respective sheet cell and located in the lower left corner of the media boxes. The embodiment of FIG. 6 thus illustrates the versatility of the automatic dynamic placement of the present disclosure.

Figure 7:
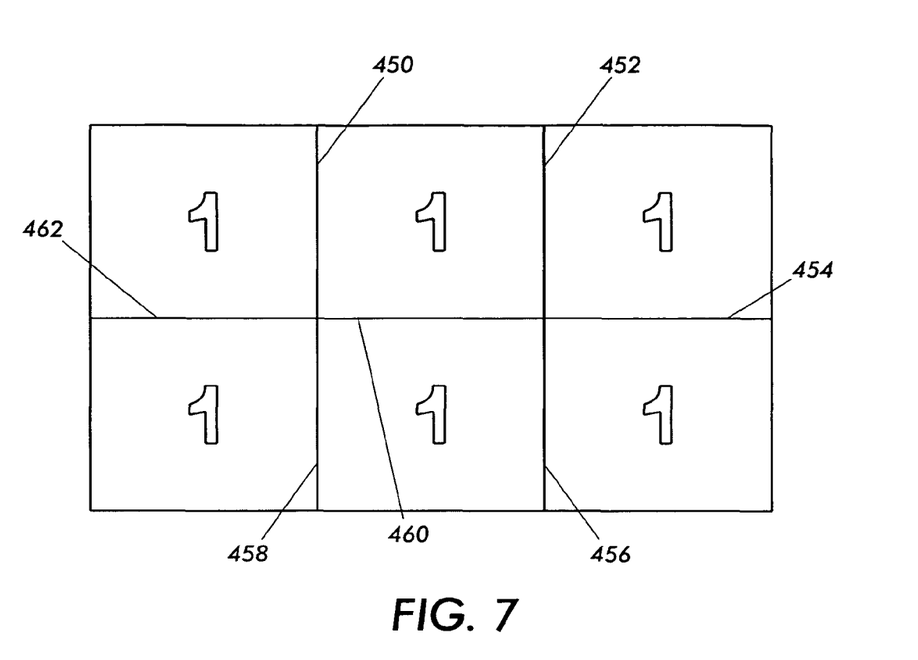
FIG. 7 is a view of an embodiment with 6-up images placed with the image trim boxes clustered on the spine of the sheet cells and filling the sheet cells.

Referring to FIG. 7, another exemplary embodiment is illustrated wherein 6-up images are placed for imposition in an arrangement where the trim boxes are clustered and completely fill the sheet cells along sheet cell boundaries 450, 452, 454, 456, 458, 460 and 462. The clustered arrangement of the trim boxes in the embodiment of FIG. 7 thus provides gutterless imposition.

Figure 8:
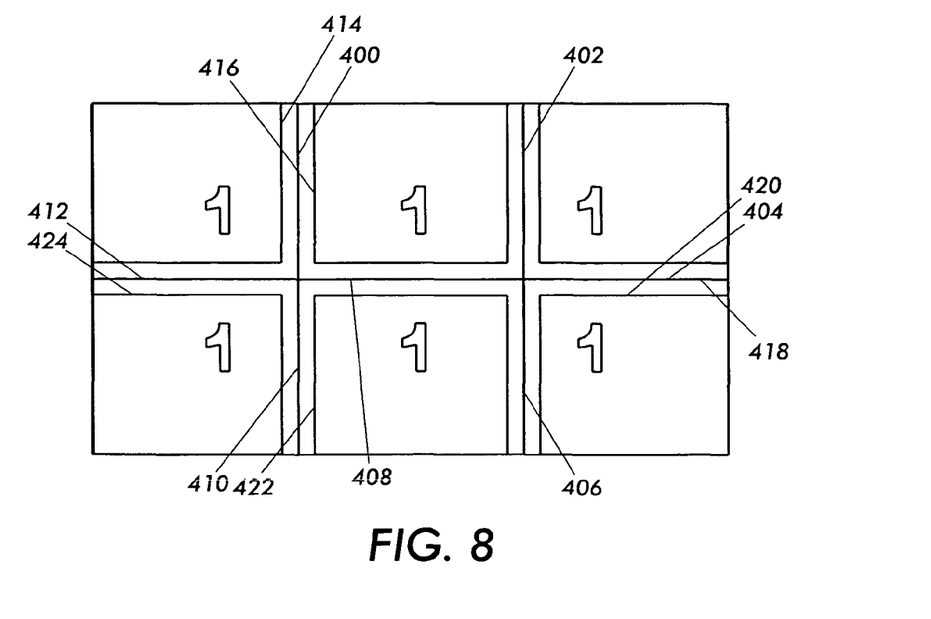
FIG. 8 is a view similar to FIG. 7 showing 6-up images with the trim boxes spaced by a gutter.

Referring to FIG. 8, another exemplary embodiment is illustrated for 6-up image placement for imposition in which the inner sheet cell boundaries are denoted by reference numerals 400, 402, 404, 406, 408, 410, 412 for the adjacent sheet cells. The boundaries of the page cells or trim boxes are denoted 414, 416, 418, 420, 422, 424 and are placed with gutters between the trim boxes and the inner sheet cell boundaries.

Figure 9:
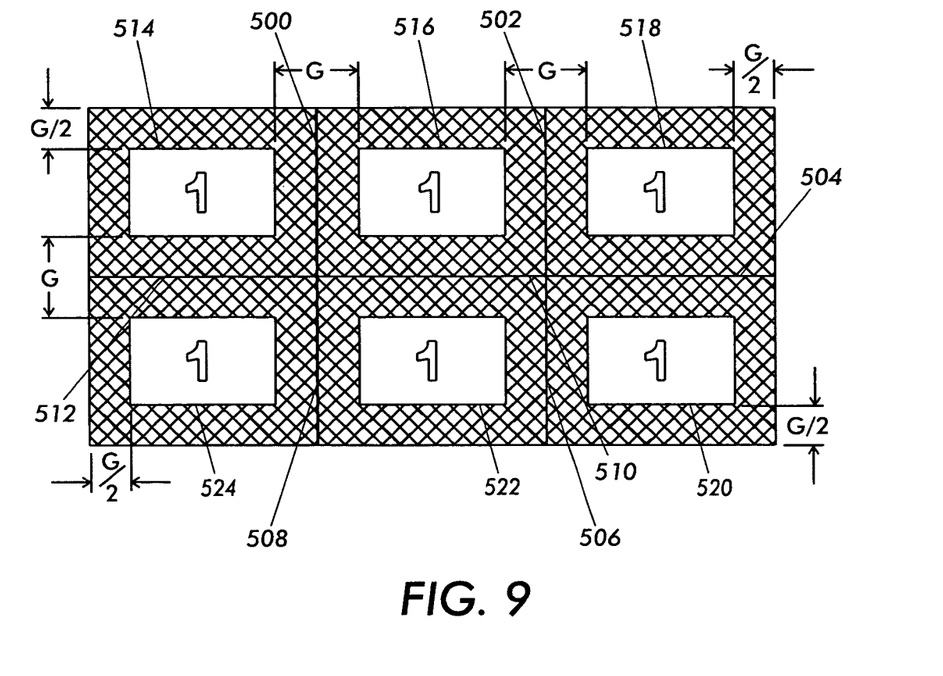
FIG. 9 is a view similar to FIG. 8 showing 6-up images spaced with a gutter and a half-gutter at the media edge; and, FIG. 10 is a block flow diagram of the method of the present disclosure.

Referring to FIG. 9, another exemplary embodiment is illustrated wherein the media sheet is divided for 6-up placement of images for imposition with common sheet cell boundaries 500, 502, 504, 506, 508, 510. Each of the sheet cells thus formed by the aforesaid boundaries has the page cells (trim boxes) for the respective images denoted 514, 516, 518, 520, 522, 524 disposed according to a preselected gutter from the central sheet cell boundaries as denoted by the reference character "g". The page cells 514, 516, 518, 520, 522, 524 each have a gutter with a width of ½ g between the respective page cell and the outer edge of the media sheet as shown in FIG. 7. This arrangement effectively centers each of trim boxes in their respective sheet cells.

Figure 10:
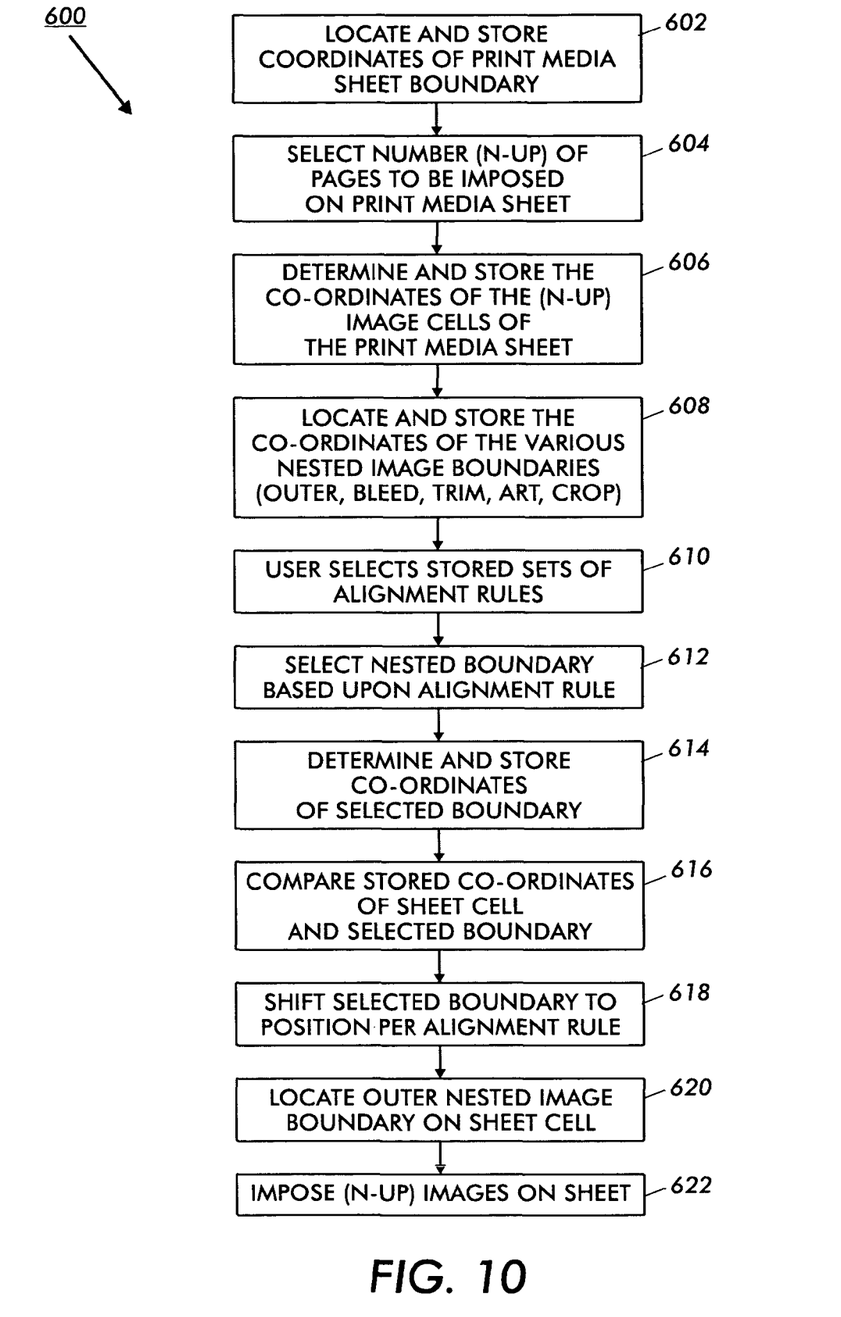

Referring to FIG. 10, the operation of the system for practicing the method of the present disclosure is indicated generally at 600, in which, at step 602, the system locates and stores the coordinates of the print media sheet boundaries and then proceeds to step 604 where the number of pages to be imposed on the print media sheet is selected. The selection may be either by the user or automatically by the system. The system then proceeds to step 606 and determines and stores the coordinates of the N-up image cells of the print media sheet. The system then proceeds to step 608 and locates and stores the coordinates of the various nested image boundaries such as the Outer (Media), the Bleed, the Trim, and if appropriate the Art and the Crop boundaries. The system then proceeds to step 610 where the selection is made by the user from a menu for stored sets of alignment rules that may be used for the imposition. The system then proceeds to step 612 and selects the nested boundary based upon the alignment rule selected in step 610.

At step 614, the system then determines and stores the coordinates of the selected one of the nested boundaries from step 612. The system then proceeds to step 616 and compares the stored coordinates of the sheet cell and the stored coordinates of the selected boundary. The system then proceeds to step 618 and shifts the selected boundary to the position determined by the selected alignment rule.

At step 620, the system proceeds to locate the outer (media) nested image boundary on the sheet cell; and, at step 622, the system imposes the N-up images on the sheet.

The present disclosure thus describes and illustrates a method of automatically placing N-up images for imposition on a print media sheet in a manner which can accommodate a user selected arrangement from a set of assignment rules without the need for individual templates. The method has particular utility in simplifying prepress operations for digital printers running a large number of jobs with small print runs, and, particularly for jobs with dissimilar dimensions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of automatically placing a plurality (N-up) of selected images in computer document language for imposition on a print media sheet in pre-press operations for a printer comprising:
    (a) automatically locating and storing boundary coordinates of the sheet;
    (b) selecting a plurality (N-up) of the images to be imposed on the sheet in N-up sheet cells;
    (c) automatically determining and storing boundary coordinates of the N-up sheet cells of the sheet;
    (d) automatically locating and storing coordinates of various nested image boundaries included in each image;
    (e) establishing and storing a set of alignment rules;
    (f) inputting a user selection from the stored alignment rules;
    g) selecting one of the nested image boundaries for each image and determining and storing the coordinates of the selected boundary;
    (h) automatically comparing the stored boundary coordinates of a corresponding one of the N-up sheet cells and the selected nested image boundary and shifting the selected nested image boundary to a position determined by the selected alignment rules with respect to an outer one of the nested image boundaries for each selected image; and,
    (i) locating the outer one of the nested image boundaries on the sheet cell for each selected image and imposing the N-up images on the sheet for digital printing.

2. The method defined in claim 1, wherein the step of determining the various nested boundaries includes identifying an outer boundary of an image in PDF language.

3. The method defined in claim 1, wherein the step of locating and storing the various nested boundaries includes identifying at least two of an art box boundary, a crop box boundary, a trim boundary, a bleed boundary and an outer boundary of a PDF image.

4. The method defined in claim 1, wherein the step of shifting the selected boundary includes shifting to a boundary of one of (a) an adjacent image cell boundary or (b) a free edge boundary of the sheet cell boundary.

5. The method defined in claim 1, wherein the step of shifting the selected boundary includes shifting the selected boundary to a preselected gutter width with respect to each of the sheet cell boundaries.

6. A method of automatically placing a plurality (N-up) of selected images in computer document language for imposition on a print media sheet in pre-press operations for a printer comprising:
(a) automatically locating and storing boundary coordinates of the sheet;
(b) selecting a plurality (N-up) of images to be imposed on the sheet;
(c) automatically locating and storing the coordinates of the aggregate of the selected image outer boundaries;
(d) establishing and storing a set of placement rules;
(e) inputting a user selection of the stored placement rules; and,
(f) comparing the stored coordinates of the aggregate of all image boundaries and the stored coordinates of the sheet boundary and placing the aggregate of the image boundaries according to the selected placement rules.

7. The method defined in claim 6, wherein the step of establishing a set of placement rules includes centering the aggregate boundary of the selected images on the sheet.

8. The method defined in claim 1, wherein the step of establishing includes locating the selected nested boundary on one of the sides of a sheet cell.

9. The method defined in claim 1, wherein the step of establishing includes orienting at least one of the images inverted with respect to an adjacent image.

10. The method defined in claim 1, wherein the step of establishing includes centering at least one image in a sheet cell.

11. A method of automatically placing a plurality (N-up) of selected images in computer document language for imposition on a print media sheet in pre-press operations for a printer comprising:
(a) automatically locating a boundary of the sheet;
(b) selecting a number (N-up) of images to be imposed on the print media sheet;
(c) automatically locating various nested boundaries of the selected images;
(d) automatically determining boundaries of N-up image cells of the print media sheet;
(e) selecting one of the nested boundaries for each image;
(f) establishing and storing a set of alignment rules;
(g) inputting a user selection of the alignment rules;
(h) automatically shifting the selected nested image boundary to a position determined by the selected alignment rules with respect to an outer one of the nested image boundaries; and,
(i) automatically locating the outer one of the nested image boundaries on the sheet cell and imposing the N-up images on the sheet for printing.

12. The method defined in claim 11, wherein the step of locating a boundary of the sheet includes locating and storing the coordinates of the sheet boundary.

13. The method defined in claim 11, wherein the step of locating various nested boundaries of the selected images includes the step of locating and storing the coordinates of the nested boundaries.

14. The method defined in claim 11, wherein the step of shifting the selected nested boundary includes the step of comparing stored coordinates of the outer boundary of the nested boundaries and the coordinates of the selected nested boundary.

15. The method defined in claim 11, wherein the step of establishing a set of alignment rules includes setting a desired gutter width between the selected boundary of adjacent images and establishing an aggregate boundary of selected images of one-half the desired gutter width.

16. The method defined in claim 11, wherein the step of establishing includes centering the selected boundary within an image cell.

17. The method defined in claim 11, wherein the step of establishing includes aligning a side of the selected nested boundary of an image with a side of an image cell.

18. The method defined in claim 11, wherein the step of establishing includes inverting one selected image.

19. The method defined in claim 11, wherein the step of establishing includes locating one side of the selected nested boundary a predetermined gutter width from a side of an image cell.

20. The method defined in claim 11, wherein the step of establishing includes rotating one of the selected images with respect to an adjacent image.

21. A method of automatically placing a plurality (N-up) of selected images in computer document language for imposition on a print media sheet in pre-press operations for a printer comprising:
(a) automatically locating and storing coordinates of the aggregate of all page cell boundaries;
(b) selecting a plurality (N-up) of the images to be imposed on the sheet in N-up sheet cells and locating and storing coordinates of each sheet cell;
(c) determining and storing the coordinates of the page cell for each of the N-up images;
(d) establishing a set of page cell placement rules;
(e) inputting user selection of selected rules;
(f) automatically comparing the stored coordinates of a page cell and the corresponding sheet cell for each selected image and locating the page cell in the sheet cell according to the selected placement rules;
(g) automatically locating and storing the aggregate of all page cell boundaries;
(h) establishing a set of aggregate boundary placement rules; and,
(i) automatically comparing the stored coordinates of the aggregate boundary and placing the aggregate according to the placement rules.

\* \* \* \* \*